United States Patent
Arima et al.

(10) Patent No.: US 7,460,502 B2
(45) Date of Patent: Dec. 2, 2008

(54) SCHEDULING CREATION APPARATUS, BASE STATION APPARATUS, AND RADIO COMMUNICATION METHOD

(75) Inventors: Takenobu Arima, Yokosuka (JP); Kazuyuki Miya, Kawasaki (JP)

(73) Assignee: Panasonic Corporation, Osaka (JP)

( * ) Notice: Subject to any disclaimer, the term of this patent is extended or adjusted under 35 U.S.C. 154(b) by 823 days.

(21) Appl. No.: 10/250,487

(22) PCT Filed: Nov. 11, 2002

(86) PCT No.: PCT/JP02/11712

§ 371 (c)(1), (2), (4) Date: Jul. 3, 2003

(87) PCT Pub. No.: WO03/041439

PCT Pub. Date: May 15, 2003

(65) Prior Publication Data

US 2004/0092290 A1  May 13, 2004

(30) Foreign Application Priority Data

Nov. 9, 2001  (JP)  ............................ 2001-345444

(51) Int. Cl.
*H04Q 7/00* (2006.01)

(52) U.S. Cl. .................. 370/329; 370/335; 370/468

(58) Field of Classification Search ................ 370/331, 370/342, 347, 338, 349, 352, 278, 528, 466, 370/458

See application file for complete search history.

(56) References Cited

U.S. PATENT DOCUMENTS 6,498,933 B1 * 12/2002 Park et al. ................... 455/436
6,785,250 B2 * 8/2004 Vayanos et al. .............. 370/335
6,868,075 B1 * 3/2005 Narvinger et al. ........... 370/335
7,003,296 B2 * 2/2006 de Montgolfier ............ 455/436
7,180,902 B1 * 2/2007 Raaf et al. ................... 370/441
7,197,027 B1 * 3/2007 Raaf et al. ................... 370/349

(Continued)

FOREIGN PATENT DOCUMENTS

JP  2000115861  4/2000

(Continued)

OTHER PUBLICATIONS

International Search Report dated Feb. 25, 2003.

(Continued)

*Primary Examiner*—Bob A Phunkulh
(74) *Attorney, Agent, or Firm*—Dickinson Wright, PLLC

(57) ABSTRACT

The CM controller 101 outputs times at which signals are sent to various communication terminal apparatuses in a compressed mode based on information on the compressed mode sent from a host station such as a control station apparatus to the scheduler 102, coder 105 and modulator 106. The scheduler 102 decides times (order) at which packet data is sent to the respective communication terminal apparatuses based on priority information such as channel conditions and times at which signals are sent in the compressed mode and outputs schedule information indicating the times for creating this packet data to the switch circuit 104. The switch circuit 104 outputs the packet data to be sent to the communication terminal apparatuses sequentially to the coder 105 according to the schedule created by the scheduler 102.

2 Claims, 10 Drawing Sheets

U.S. PATENT DOCUMENTS 7,200,136 B1 *   4/2007   Raaf et al. .................. 370/349
2003/0026235 A1 *   2/2003   Vayanos et al. ............. 370/342
2004/0071163 A1 *   4/2004   Hogberg et al. ............ 370/468

FOREIGN PATENT DOCUMENTS

JP         2001045536         2/2001
JP         2001230756         8/2001
WO         0035225            6/2000

OTHER PUBLICATIONS

3G TS 25.212 v3.2.0 (Mar. 2000), 3rd Generation Partnership Project: Technical Specification Gr up Radio Access Network; Multiplexing and channel coding (FDD) (Release 1999), pp. 1-58.

* cited by examiner

FIG.9

| UE1 | 4.5 | 3 | 4.5 | 0.5 | 0 | 0 | 0.5 | 3 | 4.5 | 1.5 | 3 | 1.5 | 0 | 0 | 1.5 |
|---|---|---|---|---|---|---|---|---|---|---|---|---|---|---|---|
| | 1.5 | | | | | | | | | | | | | | |

| UE2 | 1 | 0 | 1 | 4.5 | 1.5 | 3 | 4.5 | 0.5 | 0 | 1.5 | 3 | 4.5 | 3 |
|---|---|---|---|---|---|---|---|---|---|---|---|---|---|
| | | 0 | | | | | | | | | | 1.5 | |

| UE3 | 1 | 3.5 | 1 | 2 | 3 | 1 | 2.5 | 2 | 1 | 2.5 | 1 | 2 | 3 | 1 |
|---|---|---|---|---|---|---|---|---|---|---|---|---|---|---|
| | 2 | | | | | | | | | | | | | |

SL1 SL2 SL3 SL4 SL5 SL6 SL7 SL8 SL9 SL10 SL11 SL12 SL13 SL14 SL15 SL16

SCHEDULING CREATION APPARATUS, BASE STATION APPARATUS, AND RADIO COMMUNICATION METHOD

TECHNICAL FIELD

The present invention relates to a scheduling apparatus, base station apparatus and radio communication method, and more particularly, to a scheduling apparatus, base station apparatus and radio communication method preferably used for a DSCH (Downlink Shared Channel) or HSDPA (High Speed Downlink Packet Access).

BACKGROUND ART

A W-CDMA (Wideband-CDMA) system is a kind of CDMA (Code Division Multiple Access), which is one of digital radio communication access systems. This W-CDMA standard specifies a DSCH as a downlink channel shared by a plurality of communication terminals.

This DSCH is a channel for transmitting only data with data allocated in predetermined transmission units (e.g., frame units) to a plurality of terminals, and is a channel for data communications. Therefore, the DSCH is expected to be used for downlink high-speed packet data transmission.

A communication terminal using a DSCH establishes a separate downlink (DPCH:Dedicated Physical CHannel) and carries out path search and channel estimation using known signals (e.g., pilot signals) included in the DSCH signal. Or path search and channel estimation are carried out using known signals of P-CPICH (Primary-Common PIlot CHannel) which is common to various communication terminals. This allows reliable demodulation of a DSCH signal.

Furthermore, HSDPA is available as one of communication methods for transmitting packet data at high speed using a downlink channel shared by a plurality of communication terminals. HSDPA is a communication method capable of improving average throughput by changing channel CODEC, spreading factor, multiplexing number or (multi-value) modulation according to the channel condition and changing a transmission rate to thereby improve average throughput.

On the other hand, in a cellular communication, a communication terminal apparatus moves and may switch between base station apparatuses with which it communicates.

For example, when handover takes place between W-CDMA systems or between W-CDMA and GSM (Global System for Mobile Communications) systems using carriers with different frequencies, in order to receive signals at different frequencies and switch between base stations, the communication terminal apparatus needs to measure necessary signal levels and receive necessary control information.

Therefore, in the case of W-CDMA, the base station apparatus sends a signal in a compressed mode and the communication terminal monitors information from the cell to which the own station belongs and information from a base station apparatus in an adjacent cell.

In a compressed mode, a spreading factor of information data with respect to a frame is temporarily reduced, frames are sent with a certain time interval with a reduced spreading factor created between frames and the communication terminal monitors information from the cell to which the own station belongs and a base station apparatus in an adjacent cell using this idle time.

That is, the base station apparatus creates a time during which no data is sent within a range that does not affect the communication and the communication terminal apparatus monitors information of the cell to which the own station belongs and a base station apparatus in an adjacent cell during this time.

When both a packet data transmission and compressed mode using shared channels such as the above-described DSCH and HSDPA are applied, the base station apparatus may send packet data to the communication terminal apparatus while the communication terminal apparatus is conducting carrier sensing with frequencies not used for communications in the compressed mode.

For example, when searching for another base station, the communication terminal apparatus may receive a signal with a frequency other than that used for reception of packet data, and therefore the communication terminal apparatus cannot receive packet data sent from the base station during this time. Furthermore, this packet data becomes an interference component to the other communication terminal apparatus. As a result, throughput of the overall system decreases.

Furthermore, when the circuit is adapted so as to be able to receive signals with a plurality of frequencies to receive packet data during carrier sensing, the problem is that this increases the circuit scale of the communication terminal apparatus.

DISCLOSURE OF INVENTION

It is a first object of the present invention to provide a scheduling apparatus, base station apparatus and radio communication method capable of improving throughput of the overall system when both packet data transmission using a shared channel and compressed mode are applied.

This object can be attained by sending packet data during a time other than the time during which signals are not sent in a compressed mode in packet data transmission using a shared channel.

BRIEF DESCRIPTION OF DRAWINGS

FIG. 9 illustrates an example of priority information used in the base station apparatus according to the above-described embodiment.

BEST MODE FOR CARRYING OUT THE INVENTION

The present inventor et al. have come up with the present invention noticing that when both packet data transmission using a shared channel and compressed mode are applied in a communication between a base station apparatus and a radio communication terminal apparatus, the time which becomes a gap in the compressed mode overlaps with the packet data transmission time.

That is, the subject matter of the present invention is to send packet data in a time other than the time during which signals are not sent in a compressed mode in packet data transmission using a shared channel.

With reference now to the attached drawings, embodiments of the present invention will be explained below.

EMBODIMENT 1

Figure 1:
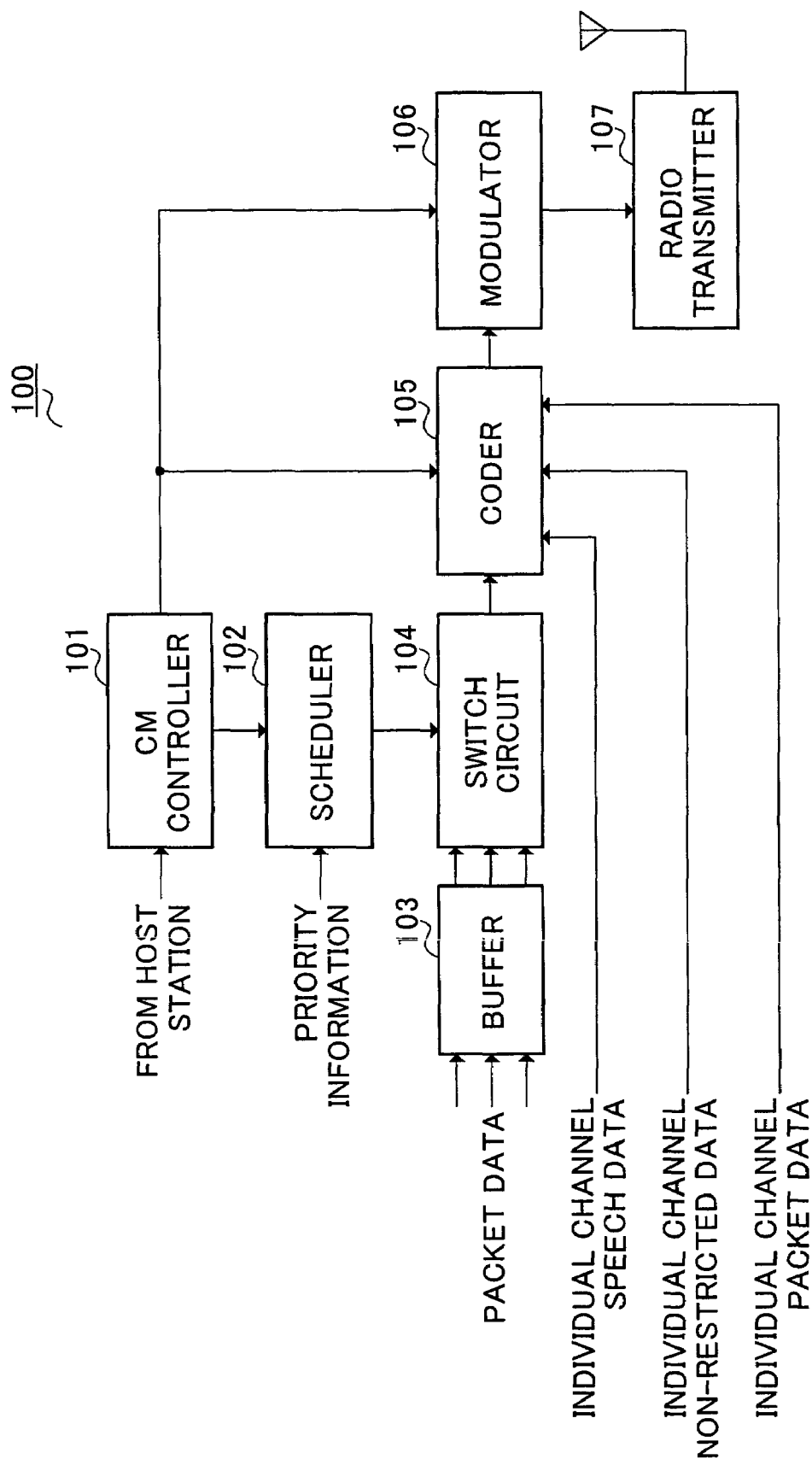
FIG. 1 is a block diagram showing a configuration of a base station apparatus according to Embodiment 1 of the present invention.

FIG. 1 a block diagram showing a configuration of a base station apparatus according to Embodiment 1 of the present invention. A base station apparatus 100 in FIG. 1 is a base station apparatus that communicates with a plurality of communication terminal apparatuses and sends packet data using a shared channel. Here, the shared channel refers to a shared channel used for downlink packet data communication such as DSCH or HSDPA, etc.

In FIG. 1, the base station apparatus 100 is mainly constructed of a CM controller 101, a scheduler 102, a buffer 103, a switch circuit 104, a coder 105, a modulator 106 and a radio transmitter 107.

The CM controller 101 outputs a time for sending a signal in a compressed mode to each communication terminal apparatus from information on the compressed mode sent from a host station such as a control station apparatus to the scheduler 102 and coder 105, and outputs an instruction for a change of a coding rate to the coder 105 and outputs an instruction for a change of a spreading factor to the modulator 106.

In the compressed mode, the spreading factor of information data of an individual physical channel with respect to a frame is reduced temporarily, and thereby frames are sent with a certain time interval with a reduced spreading factor created between frames and the communication terminal monitors information from the base station apparatus in the cell to which the own station belongs and that in an adjacent cell using this idle time.

The scheduler 102 determines times (order) for sending packet data to the respective communication terminal apparatuses based on priority information such as a channel condition and time for sending a signal in a compressed mode and outputs schedule information indicating the time for creating this packet data to the switch circuit 104.

The buffer 103 temporarily stores packet data to be sent to each communication terminal apparatus and outputs it to the switch circuit 104.

The switch circuit 104 outputs packet data to be sent to the respective communication terminal apparatuses to the coder 105 one by one according to the schedule created by the scheduler 102.

The coder 105 codes the packet data output from the switch circuit 104 and outputs it to the modulator 106. Likewise, the coder 105 codes speech data, non-restricted data and packet data to be sent using individual channels and outputs them to the modulator. When an instruction for sending data in a compressed mode is received from the CM controller 101, the coder 105 codes data by reducing the data coding rate, outputs it to the modulator 106 and creates a time during which data is sent in a certain transmission time unit (frame) of the signal to be sent and a time during which data is not sent.

The modulator 106 modulates and spreads the data output from the coder 105, multiplexes the data and outputs to the radio transmitter 107. When an instruction for sending the data in a compressed mode is received from the CM controller 101, the modulator 106 spreads the data by reducing the data spreading factor and creates a time during which data is sent in a certain transmission unit time (frame) of the signal to be sent and a time during which data is not sent.

The radio transmitter 107 converts the frequency of the data output from the modulator 106 to a radio frequency and sends it as a radio signal.

Then, the scheduling operation of the base station apparatus according to this embodiment will be explained.

Figure 2:
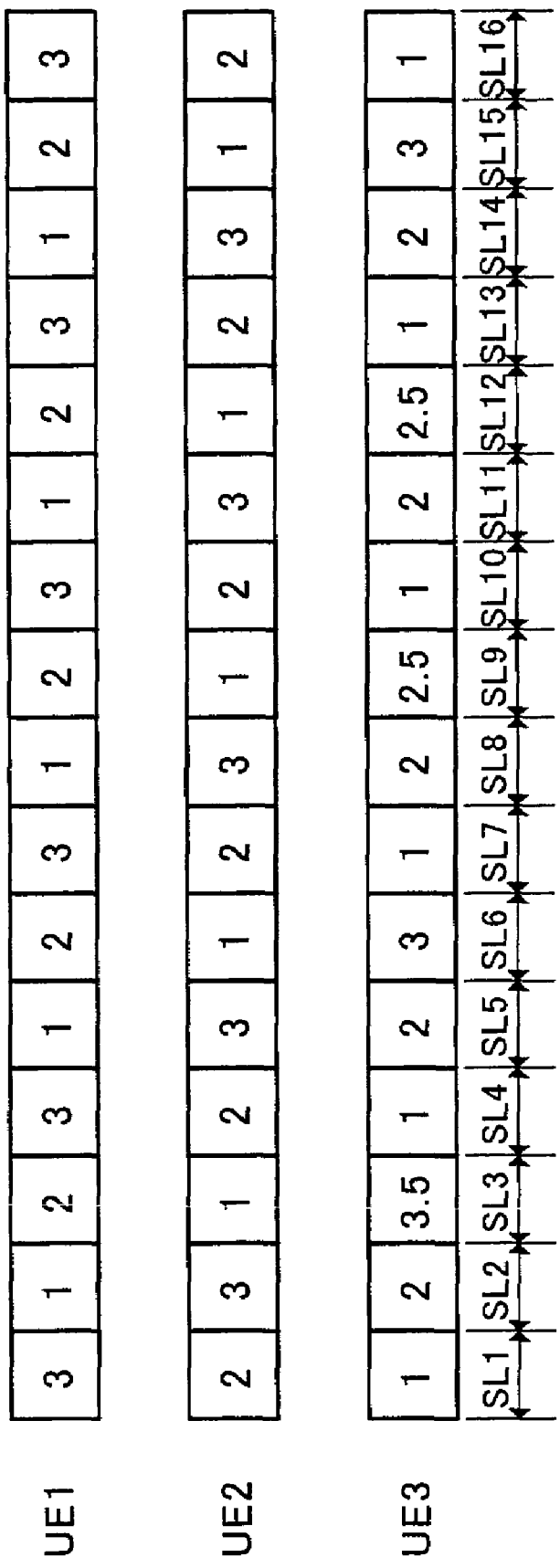
FIG. 2 illustrates an example of priority information used in the base station apparatus according to the above-described embodiment.

FIG. 2 illustrates an example of priority information used in the base station apparatus according to this embodiment. In FIG. 2, the horizontal axis indicates times at which packet data is sent. FIG. 2 shows priority information in slot (hereinafter referred to as "SL") 1 to SL 16 in sending signals to each communication terminal. Here, the priority with which a signal is sent increases as the numerical value increases. In FIG. 2, "UE" denotes a communication terminal apparatus.

The scheduler 102 compares priority information of UEs in slot units and creates a schedule for sending packet data to a UE with the highest priority.

For example, in SL1, the priority for UE1 is "3" and the priority for UE2 is "2" and the priority for UE3 is "1". The scheduler 102 decides to send packet data to UE1 with the highest priority in a time of SL1.

Then, in SL2, the priority for UE1 is "1" and the priority for UE2 is "3" and the priority for UE3 is "2". The scheduler 102 decides to send packet data to UE2 with the highest priority in a time of SL2. Likewise, the scheduler 102 decides packet data transmission schedules from SL3 onward.

Figure 3:
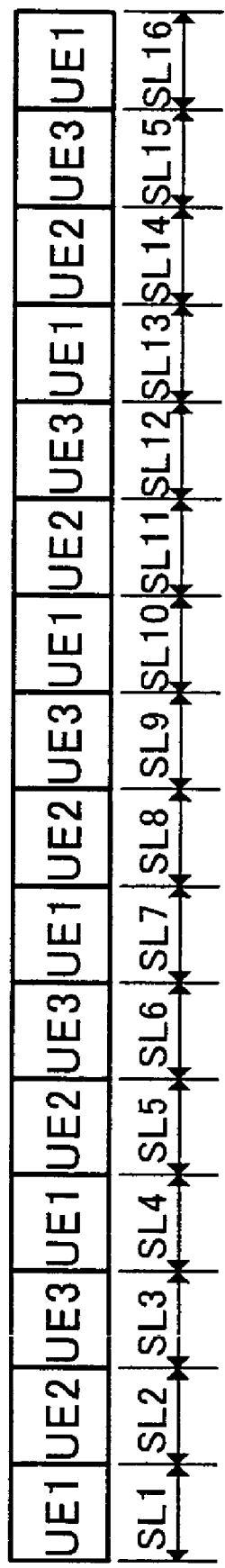
FIG. 3 illustrates an example of a schedule of packet data transmission used in the base station apparatus according to the above-described embodiment.

FIG. 3 illustrates an example of a packet data transmission schedule used in the base station apparatus according to this embodiment. In FIG. 3, the horizontal axis denotes times at which packet data is sent.

In the schedule of FIG. 3, in SL1 the packet data for UE1 is sent and in SL2 the packet data for UE2 is sent. Likewise, FIG. 3 shows up to SL16 and destinations to which packet data is sent.

The schedule in FIG. 3 does not consider a section (gap) where no signal is sent in the compressed mode. Therefore, the scheduler 102 creates a schedule with a gap taken into consideration for the schedule in FIG. 3.

Figure 4:
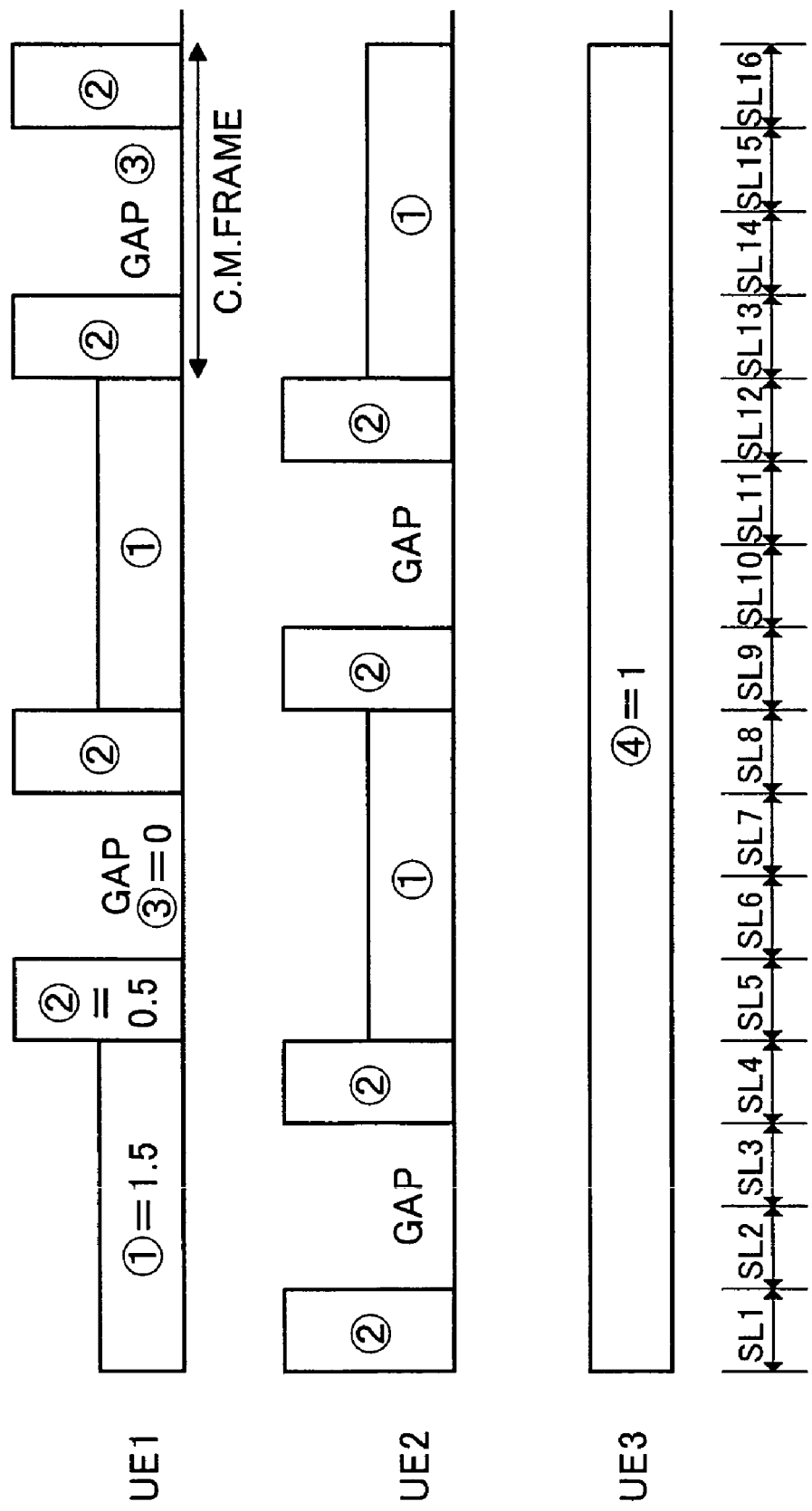
FIG. 4 illustrates an example of transmission signal power in the base station apparatus according to the above-described embodiment.

FIG. 4 shows an example of transmission signal power in the base station apparatus according to this embodiment. In FIG. 4, the horizontal axis indicates times at which packet data is sent.

The CM controller 101 instructs a time at which a signal is sent in the compressed mode to each communication terminal apparatus from the information on the compressed mode sent from a host station such as a control station apparatus.

In FIG. 4, in a transmission directed to UE1, the time from SL5 to SL8 and the time from SL13 to SL16 are designated as C.M. frames (Compressed Mode frames). Of the C.M. frames, packet data is sent with increased transmit power in SL5, SL8, SL13 and SL16 and no packet data is sent in SL6, SL7, SL14 and SL15.

Of the schedules created according to the priority information shown in FIG. 3, the CM controller 101 deletes the schedules assigning transmissions to UE1 to the slots SL6, SL7, SL14 and SL15 to which no packet data is sent to UE1. For example, the CM controller 101 decides that the schedule for UE1 assigned to the SL7 overlaps with the gap during which no signal is sent to UE1 and deletes this schedule.

Likewise, the CM controller 101 decides that the schedules for UE2 assigned to SL2 and SL1 overlap with the gap during which no signal is sent to UE2 and deletes these schedules.

Figure 5:
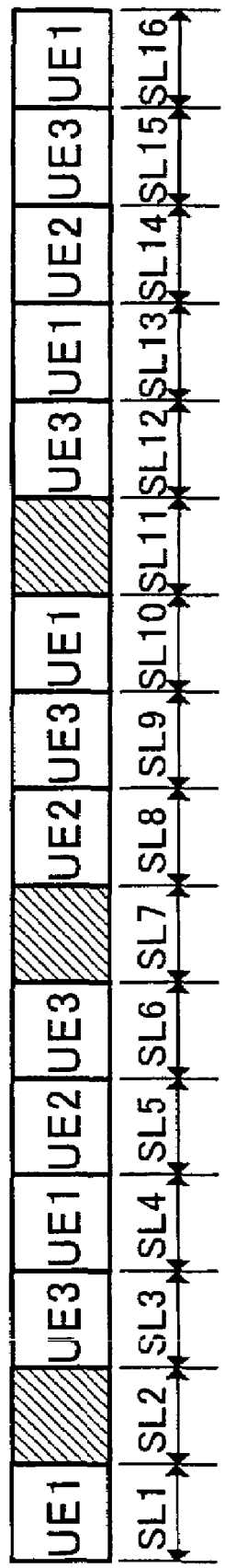
FIG. 5 illustrates an example of a schedule in packet data transmission used in a base station apparatus according to the above-described embodiment.

FIG. 5 illustrates an example of a schedule in packet data transmission used in the base station apparatus according to this embodiment. In FIG. 5, the horizontal axis indicates times at which packet data is sent.

The schedule in FIG. 5 does not include any schedule for sending packet data during gaps in the compressed mode for each communication terminal to which packet data is sent.

Figure 6:
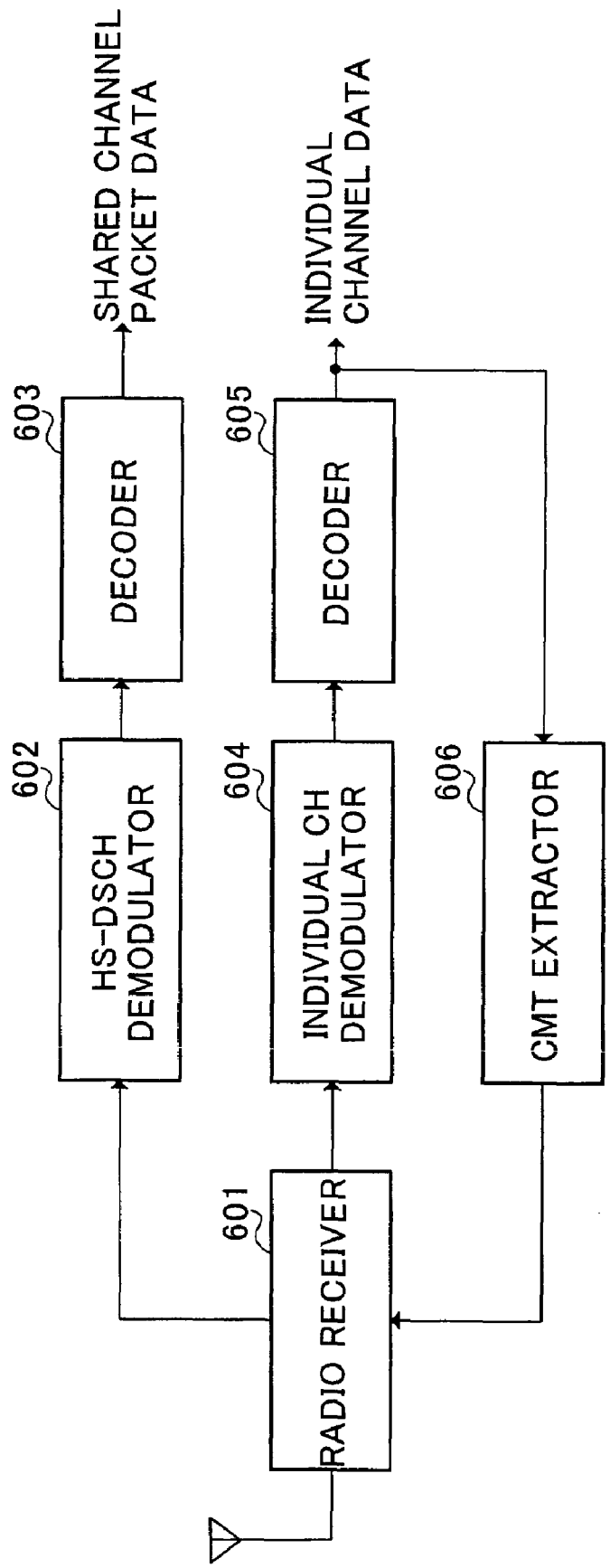
FIG. 6 is a block diagram showing a configuration of a communication terminal apparatus according to the above-described embodiment.

Then, the communication terminal apparatus according to this embodiment will be explained. FIG. 6 is a block diagram showing a configuration of a communication terminal apparatus according to this embodiment. In FIG. 6, a communication terminal apparatus 600 is mainly constructed of a radio receiver 601, an HS-DSCH demodulator 602, a decoder 603, an individual CH demodulator 604, a decoder 605 and a CMT extractor 606.

The radio receiver 601 receives a radio signal and converts it to a baseband frequency and outputs the received signal obtained to the HS-DSCH demodulator 602 and individual CH demodulator 604.

When an instruction about a gap during which no signal is sent to the own station is received from the CMT extractor 606, the radio receiver 601 receives a radio signal with a frequency used by a base station apparatus to which the own station does not belong, and searches for a base station apparatus which becomes the handover destination. On the other hand, when an instruction that it is not a gap during which no signal is sent to the own station is received from the CMT extractor 606, the radio receiver 601 receives a radio signal with a frequency used by the base station apparatus to which the own station belongs.

Here, the frequency of the signal transmitted by the base station apparatus to which the own station belongs may be different from the frequency of the signal transmitted by the base station to which the own station does not belongs, and therefore the radio receiver 601 receives a radio signal with the frequency of a desired signal according to the instruction from the CMT extractor 606.

The HS-DSCH demodulator 602 demodulates the received signal and outputs it to the decoder 603. The decoder 603 decodes the received signal demodulated by the HS-DSCH demodulator 602 and obtains packet data transmitted through a shared channel.

The individual CH demodulator 604 demodulates the received signal and outputs it to the decoder 605. The decoder 605 decodes the received signal demodulated by the individual CH demodulator 604 and obtains data sent through an individual channel. Then, the individual CH demodulator 604 outputs this data to the CMT extractor 606.

The CMT extractor 606 extracts information on the control of the compressed mode from the received data and notifies to the radio receiver of the time of the gap during which no signal is sent from the base station apparatus to the own station based on this information.

Thus, according to the base station apparatus of this embodiment, in the compressed mode, packet data is sent during a time other than a time during which no signal is sent, which prevents packet data that cannot be received from being sent and can reduce interference with the communication terminal apparatus. Furthermore, as a result, it is possible to improve the throughput of the overall system. Furthermore, the communication terminal need not receive packet data and acquire information on the cell to which the own station belongs and an adjacent cell simultaneously and it is possible for one reception circuit to receive packet data and acquire information on the cell to which the own station belongs and an adjacent cell simultaneously and thereby reduce the circuit scale.

The base station apparatus of this embodiment can also perform operation without sending packet data to the communication terminal apparatus for one entire transmission time unit (frame) including gaps.

EMBODIMENT 2

Embodiment 2 will describe an example of a case where the base station apparatus sends packet data to one communication terminal apparatus during a transmission time during which an individual channel for another communication terminal apparatus becomes a gap in a compressed mode.

The base station apparatus according to Embodiment 2 adopts the same configuration as that of the base station apparatus in FIG. 1, but it is different from the base station apparatus 100 in FIG. 1 in the operation of the scheduler 102 in FIG. 1 of creating a schedule for sending packet data to another communication terminal apparatus during a transmission time which becomes a gap in the compressed mode.

Figure 7:
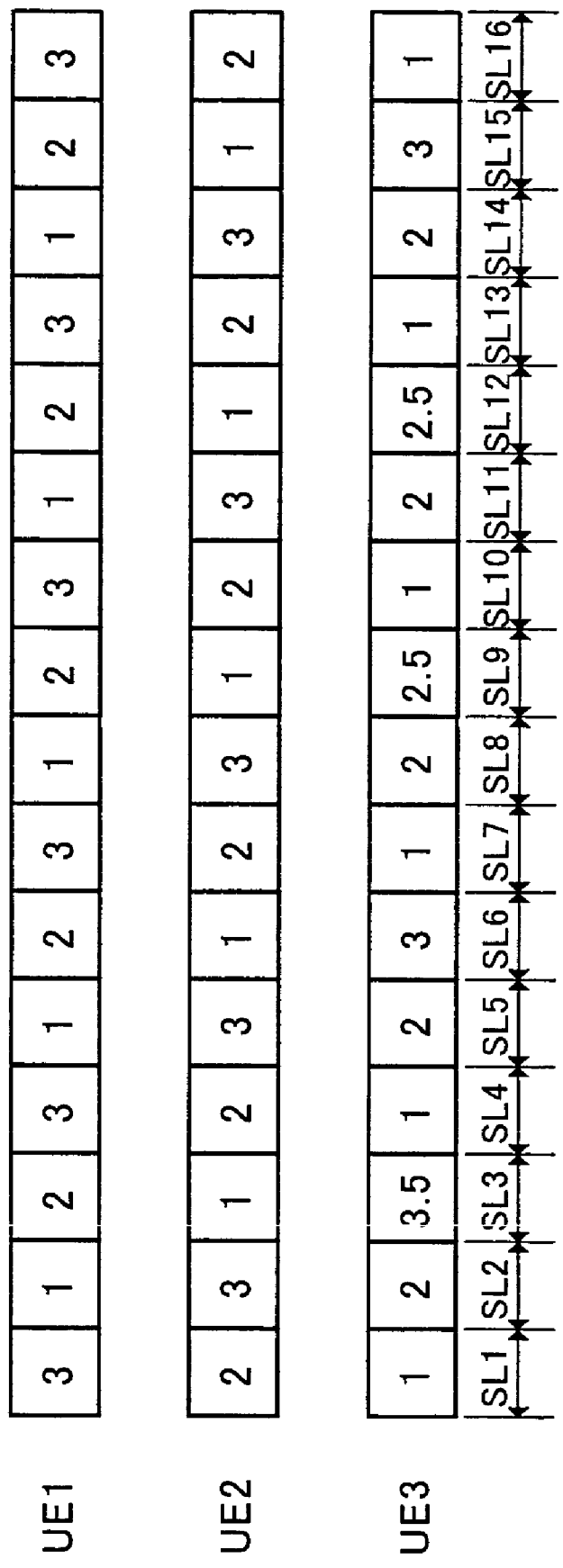
FIG. 7 illustrates an example of priority information used in a base station apparatus according to Embodiment 2 of the present invention.

FIG. 7 illustrates an example of priority information used in the base station apparatus according to Embodiment 2 of the present invention. In FIG. 7, the horizontal axis indicates times at which packet data is sent. FIG. 7 shows priority information in SL1 to SL16 when sending signals to each communication terminal apparatus. Here, the priority in sending signals increases as the numerical value increases. In FIG. 7, "UE" denotes a communication terminal apparatus.

The scheduler 102 compares priority information of UEs in slot units and creates a schedule for sending packet data to a UE with the highest priority.

For example, in SL1, the priority for UE1 is "3" and the priority for UE2 is "2" and the priority for UE3 is "1". The scheduler 102 decides to send packet data to UE1 with the highest priority in a time of SL1.

Then, in SL2, the priority for UE1 is "1" and the priority for UE2 is "3" and the priority for UE3 is "2". The scheduler 102 decides to send packet data to UE2 with the highest priority in a time of SL2. Likewise, the scheduler 102 decides packet data transmission schedules from SL3 onward.

Then, the scheduler 102 weights times during which signals are sent for respective UEs in a compressed mode and normal mode with a C.M. (Compressed Mode) count.

Figure 8:
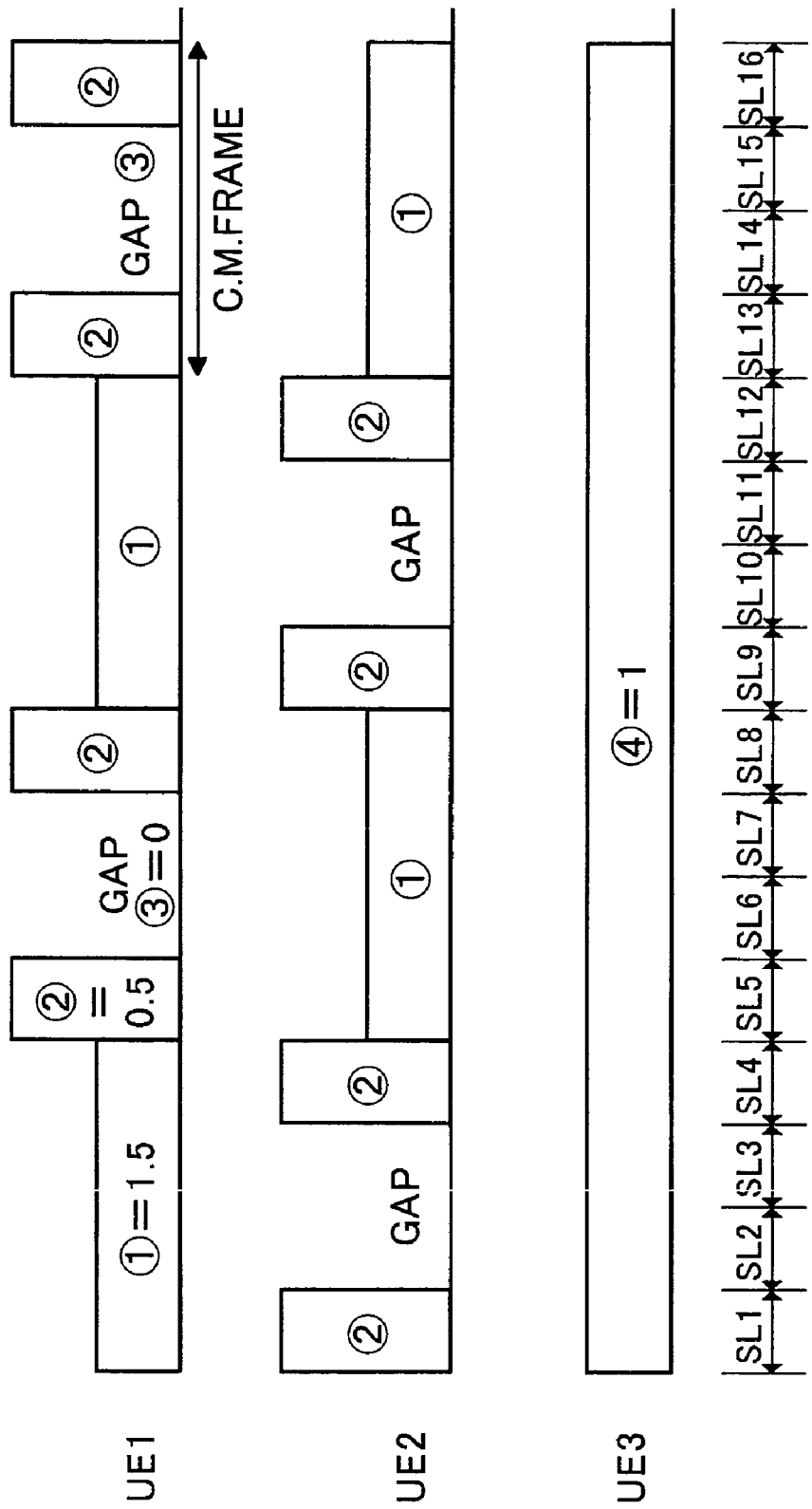
FIG. 8 illustrates an example of transmission signal power in the base station apparatus according to the above-described embodiment.

FIG. 8 illustrates an example of transmission signal power in the base station apparatus according to this embodiment. In FIG. 8, the horizontal axis shows times at which packet data is sent.

The CM controller 101 instructs times at which signals are sent in the compressed mode to each communication terminal apparatus based on the information on the compressed mode sent from a host station such as the control station apparatus.

In FIG. 8, in a transmission directed to UE1, the time from SL5 to SL8 and the time from SL13 to SL16 are designated as C.M. frames (Compressed Mode frames). Of the C.M. frames, packet data is sent with transmit power increased in SL5, SL8, SL13 and SL16 and no packet data is sent in SL6, SL7, SL14 and SL15.

Since transmission for UE3 is carried out in a normal mode, the scheduler 102 sets the C.M. count to "1" for any transmission time.

On the other hand, when transmission is performed n a compressed mode, part of the transmission time becomes a gap and the communication terminal apparatus is receiving a signal with a different frequency, and so packet data cannot be received. That is, in the compressed mode, the proportion of time during which packet data can be sent is smaller than that in the normal mode. Thus, the scheduler 102 assigns particularly a portion of time other than the gap during which transmission is possible with normal transmit power preferentially as the packet data transmission time.

For example, when the base station apparatus 100 sends packet data to UE1, from SL1 to SL4, the base station apparatus 100 can transmit packet data with a normal transmit power value to UE1, and therefore the scheduler 102 sets the C.M. count to "1.5" which is a setting such that the time from SL1 to SL4 is assigned to UE1 with higher priority than UE3 in the normal mode.

Then, in SL6 and SL7 which correspond to a gap, when the base station apparatus 100 sends packet data to UE1, UE1 cannot receive packet data because it is monitoring the cell to which the own station belongs and an adjacent cell. Furthermore, this packet data becomes an interference component to other communication terminal apparatuses. The C.M. count is set to "0" which is a setting such that no packet data is sent because of the gap.

Furthermore, at SL5 and SL8, packet data is sent with a greater transmit power value than a normal value to compensate for a drop in the transmission rate corresponding to interrupted transmission because of the gap. A signal transmitted with a greater transmit power value constitutes an interference component to the own station. Therefore, the scheduler 102 sets the schedule by assigning lower priority for the time during which packet data is transmitted with a large transmit power value than the time during which packet data can be transmitted with a normal transmit power value.

Then, the scheduler 102 creates priority information by combining priority information such as the channel condition in FIG. 7 and priority information on transmit power and gaps in FIG. 8 for each communication terminal and each transmission time. For example, the scheduler 102 creates priority information by multiplying the priority information such as the channel condition in FIG. 7 by the priority information on transmit power and gaps in FIG. 8.

FIG. 9 illustrates an example of priority information used in the base station apparatus according to this embodiment. The priority information in FIG. 9 results from a multiplication of the priority information in FIG. 7 by the priority information in FIG. 8 for each communication terminal and for each transmission time.

In FIG. 9, the priority information at SL1 directed to UE1 is "4.5" which is a result of a multiplication of priority "3" in SL1 directed to UE1 in FIG. 7 by priority "1.5" in SL1 directed to UE1 in FIG. 8. Likewise, other slots, priority information on other UEs are decided, too.

Figure 10:
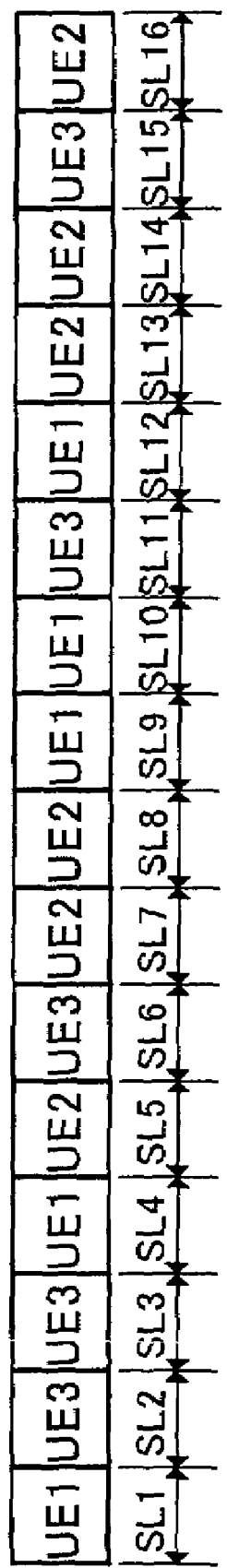
FIG. 10 illustrates an example of packet data transmission schedule used in the base station apparatus according to the above-described embodiment.

FIG. 10 illustrates an example of a schedule of packet data transmission used in the base station apparatus according to this embodiment. In FIG. 10, the horizontal axis shows times at which packet data is sent.

The scheduler 102 compares priority information of UEs in slot units and creates a schedule for sending packet data to a UE with the highest priority.

For example, in SL1, the priority for UE1 is "4.5" and the priority for UE2 is "1" and the priority for UE3 is "1". The scheduler 102 decides to send packet data to UE1 with the highest priority in a time of SL1.

Then, in SL2, the priority for UE1 is "1.5" and the priority for UE2 is "0" and the priority for UE3 is "2". The scheduler 102 decides to send packet data to UE3 with the highest priority in a time of SL2. Likewise, the scheduler 102 decides packet data transmission schedules from SL3 onward.

Here, priority information in a gap section becomes "0" which is lowest, and therefore a schedule for sending packet data to other communication terminals with higher priority is created.

Thus, the base station apparatus according to this embodiment assigns, in addition to priority of packet data transmission decided from the channel condition, assigns weights in such a way that no packet data is sent to sections where no signal is sent, assigns weights based on transmit power values for sections where signals are sent, assigns schedules for sending packet data, sends packet data to the respective communication terminals, and can thereby eliminate times during which no packet data is sent and send packet data with a high degree of time efficiency. As a result, it is possible to improve throughput of the overall system.

The C.M. factors set in this embodiment are only an example and their values are not limited to particular values if they are at least factors determined according to the presence/absence of a gap, the degree of interference of transmit power values, etc., with other communication terminal apparatuses. Furthermore, in the above explanations, C.M. factors are determined from transmit power values, but the way of determining C.M. factors is not limited to this, and C.M. factors can also be determined by any parameters which at least relate to variations in a transmission system in a compressed mode.

Furthermore, the type of the compressed mode is not limited to the one described above, but any type of the compressed mode is applicable to a communication method which at least uses a compressed mode that sets gaps during which no packet data is sent.

Furthermore, the portion for determining the above-described schedule can also be mounted on any apparatus other than a base station apparatus. It is applicable to any apparatus that at least transmits packet data or controls transmission using a shared channel. For example, it is possible to adopt a configuration in such a way that the above-described schedules are set for an apparatus such as an RNC with higher ranking than a base station apparatus, the schedule is notified to the base station apparatus to which packet data is sent and the base station apparatus can send packet data to the respective communication terminal apparatuses according to this schedule.

Furthermore, the present invention is not limited to the above-described embodiments, but can be implemented modified in various ways. For example, the above-described embodiments have described the case where the present invention is implemented as a base station apparatus, but the present invention is not limited to this and this radio communication method can also be implemented by software.

For example, it is possible to store a program for executing the above-described radio communication method in a ROM (Read Only Memory) beforehand and operate the program by a CPU (Central Processor Unit).

Furthermore, it is also possible to store a program that executes the above-described radio communication method in a computer-readable storage medium, record the program stored in the storage medium in a RAM (Random Access memory) of the computer and operate the computer according to the program.

As is apparent from the above-described explanations, according to the scheduling apparatus, base station apparatus and radio communication method of the present invention, the base station apparatus sends, in a packet data transmission using a shared channel, packet data in a time other than a time during which signals are not sent in a compressed mode, the communication terminal apparatus monitors the cell to which the own station belongs and an adjacent cell in a gap time in the compressed mode, receives packet data in a time other than the gap, thus improving throughput of the overall system when both packet data transmission using a shared channel and compressed mode are applied.

This application is based on the Japanese Patent Application No. 2001-345444 filed on Nov. 9, 2001, entire content of which is expressly incorporated by reference herein.

INDUSTRIAL APPLICABILITY

The present invention is preferably applicable to a base station apparatus and control station apparatus that communicate according to a DSCH (Downlink Shared Channel) or HSDPA (High Speed Downlink Packet Access) system.

What is claimed is:

1. A scheduling apparatus that creates schedules for packet data transmission at a base station apparatus that sends packet data using a shared channel, comprising:

an acquisition section that acquires, in a compressed mode of an accompanying dedicated physical channel, a transmission gap which is a time during which no signal of the accompanying dedicated physical channel is sent; and a scheduling section that creates a schedule for sending packet data to a communication terminal apparatus in a time other than the transmission gap in the communication terminal apparatus with the highest priority and sending packet data to another communication terminal apparatus in the transmission gap, wherein the acquisition section detects power of the transmission signals of the accompanying dedicated physical channel, the scheduling section creates a schedule for sending packet data in times in ascending order of power of the transmission signals preferentially.

2. A base station apparatus comprising:

an acquisition section that acquires a transmission gap which is a time during which a base station apparatus sends no signal to a corresponding terminal in a compressed mode of an accompanying dedicated physical channel;

a scheduling section that creates a schedule for sending packet data to a communication terminal apparatus in a time other than the transmission gap in the communication terminal apparatus with the highest priority and sending packet data to another communication terminal apparatus in the transmission gap; and a transmission section that transmits the packet data using a shared channel through which signals directed to a communication terminal apparatus and assigned by schedule are sent on a per divided time basis according to the schedule, wherein:

the acquisition section detects power of transmission signals of the accompanying dedicated physical channel and the scheduling section creates the schedule for sending the packet data in times in ascending order of power of the transmission signals preferentially.

* * * * *